United States Patent [19]

Wilk et al.

[11] 4,451,596

[45] May 29, 1984

[54] WATER-DILUTABLE LACQUER BINDERS BASED UPON ALKYD AND ACRYLATE RESINS

[75] Inventors: Hans-Christoph Wilk, Neuss; Bernd Wegemund, Haan, both of Fed. Rep. of Germany

[73] Assignee: Henkel Kommanditgesellschaft auf Aktien, Dusseldorf, Fed. Rep. of Germany

[21] Appl. No.: 415,067

[22] Filed: Sep. 7, 1982

Related U.S. Application Data

[63] Continuation-in-part of Ser. No. 330,275, Dec. 14, 1981, abandoned.

[30] Foreign Application Priority Data

Aug. 20, 1981 [DE] Fed. Rep. of Germany ....... 3132937

[51] Int. Cl.$^3$ ............................................. C08L 67/06
[52] U.S. Cl. .................................... 523/501; 523/502; 525/48
[58] Field of Search .................. 523/501, 502; 525/48

[56] References Cited

U.S. PATENT DOCUMENTS

| | | | |
|---|---|---|---|
| 4,259,219 | 3/1981 | Eschwey et al. | 524/560 |
| 4,268,431 | 5/1981 | Feldman et al. | 525/48 |
| 4,271,051 | 6/1981 | Eschwey | 260/404.8 |
| 4,276,388 | 6/1981 | Iwami et al. | 525/48 |
| 4,284,547 | 8/1981 | Sulick | 525/48 |
| 4,296,014 | 10/1981 | Hayashi et al. | 523/501 |
| 4,307,002 | 12/1981 | Wagner et al. | 525/48 |
| 4,367,308 | 1/1983 | Login | 525/48 |

Primary Examiner—Ronald W. Griffin
Attorney, Agent, or Firm—Ernest G. Szoke; Nelson Littell, Jr.

[57] ABSTRACT

This invention is directed to water-dilutable alkyd and acrylate resins. More particularly, this invention is directed to a method for the preparation of water-dilutable resin preparations based upon alkyd and acrylate resins which comprises the steps of:

(a) preparing an aqueous alkyd resin dispersion, wherein the alkyd resin has an acid number of from about 5 to 40 and a hydroxyl number of from about 150 to 300 and the dispersion has a solids content of from about 30 to 90 percent by weight; and (b) polymerizing monomers of acrylic acid derivatives or methacrylic acid derivatives in the dispersion from step (a), optionally in the presence of additional water, to obtain a total solids content of from about 30 to 80 percent by weight, the weight ratio of alkyd resin to acrylate resin being from about 1:4 to 9:1.

This invention is also directed to the use of these binders in water-dilutable lacquer systems.

23 Claims, No Drawings

WATER-DILUTABLE LACQUER BINDERS BASED UPON ALKYD AND ACRYLATE RESINS

CROSS-REFERENCE TO RELATED APPLICATION

This application is a continuation-in-part of co-pending U.S. patent application Ser. No. 330,275, filed Dec. 14, 1981, now abandoned.

FIELD OF THE INVENTION

This invention is directed to water-dilutable alkyd and acrylate resins. More particularly, this invention is directed to water-dilutable alkyd and acrylate resins, to ecologically acceptable water lacquers prepared therefrom, and to the preparation of said resins and lacquers.

BACKGROUND OF THE INVENTION

In the field of stove-drying lacquers, environmental considerations have attained great importance. Thus, it is desirable to formulate products which during stoving release no or a minimum of volatile, atmosphere-polluting substances, such as solvents. One way of doing this is to use what are known as water lacquers, which are water-dilutable resin preparations based upon neutralized binder resins. To formulate a resin as a water lacquer, it is generally necessary to use adjuvants, such as, for example, solvents, volatile amines, or emulsifiers. Naturally, the type and quantity of adjuvants used depends upon the chemical nature of the resin. There has been no lack of efforts to find systems wherein these adjuvants are either dispensed with entirely or at least in part or can be replaced by ecologically acceptable substances.

With regard to alkyd resin-based binders, these efforts have led to systems which even under stoving conditions do not release volatile, atmosphere-polluting components. Moreover, emulsifiers are known which lose their hydrophilic properties in the stoving process, thus ensuring the desired water stability of the lacquer coatings. Systems of this kind are described, for example, in German published applications (DE-OS) Nos. 27 10 992, 27 10 993, 27 10 994, 27 11 000, 27 11 001, 27 11 002, 27 54 092, 27 54 093, 27 54 140, and 27 54 141.

For lacquers with acrylate-based binders, it is, however, extremely difficult technically to dispense with auxiliary solvents and common emulsifiers which do not lose their hydrophilic properties during stoving. (The terminology "acrylate resins" is understood to encompass copolymers of acrylic and/or methacrylic acid and their esters as well as styrene and other common comonomers, such as acrylonitrile.) The content in such resins of components which interfere either in processing (solvents) or in such finished lacquers (emulsifiers) is due to the method of production. They are normally produced either by polymerization in solution or by emulsion polymerization. In both cases, due to the resinous consistency of the products—which is desirable in itself—it is extremely difficult to separate adjuvants. Another product method, namely, polymerization of the monomers en masse, can be handled on an industrial scale only in very expensive equipment because of the high exothermicity and rapidly increasing viscosity.

Acrylate lacquers have a number of desirable technical properties, such as, for instance, high chemical resistance, mechanical stability, and good polishability. For solvent lacquers, their use in combination with other resins, for instance alkyd resins, is known. This is taught, for example, in European Patent Application No. 6,517. There was a need, therefore, to also provide water lacquers which combine the favorable properties of ecologically acceptable alkyd resin binders with the favorable technical properties of acrylate resins. In the prior art only acrylate preparations were available for this which contained residual solvents, volatile amines, or those emulsifiers which do not lose their hydrophilic properties under stoving conditions. At best products purified by expensive methods or polymerized en masse could have been used.

OBJECTS OF THE INVENTION

It is an object of this invention to provide modified alkyd and acrylate resins.

It is also an object of this invention to provide lacquer systems based upon alkyd and acrylate resins which are suitable as binders for water-dilutable, preferably stove-drying, lacquer systems, which do not contain emulsifiers that have an effectiveness that survives stoving or that adversely affect water stability of the lacquer systems, and which do not release any volatile amines or solvents.

It is a further object of this invention to provide a lacquer system having typical favorable characteristics of acrylate resin systems, namely, high mechanical load capacity, good polishing capacity, and resistance to chemical attack, as well as typical favorable characteristics of alkyd resin systems, namely, good brilliance, luster, and body, while avoiding disadvantages of acrylate resin systems, such as the tendency of such systems to be irregular during spreading.

It is a yet further object of this invention to provide a method of preparing a lacquer system wherein, in a first stage, a water-dilutable alkyd resin dispersion is prepared which has an acid number of from about 5 to 40 and a hydroxyl number of from about 150 to 300 as well as a solids content of from about 30 to 90 percent by weight and, in a second stage, monomers of acrylic acid and/or methacrylic acid derivatives are polymerized, optionally after addition of water, in the alkyd resin dispersion, to obtain a total solids content of from about 30 to 80 percent by weight, the weight ratio of alkyd resin to acrylate resin being from about 1:4 to 9:1.

These and other objects of the invention will become more apparent in the discussion below.

DETAILED DESCRIPTION OF THE INVENTION

According to the invention, suitable lacquers based upon alkyd and acrylate resins are provided by polymerization of monomers which are normally used for the production of acrylate resins, in aqueous alkyd resin dispersions without volatile adjuvants and without non-stovable emulsifiers. The alkyd resin dispersions prepared according to the invention are finely divided microemulsions with particle sizes of from about 0.01 to 0.5 $\mu$ or colloidal resin solutions, respectively. Such preparations are described, for instance, in U.S. Pat. No. 4,271,051, incorporated herein by reference. The preparations appear clear or slightly opaque and homogeneous. When they are diluted with water, at least to a solids content of 50 percent by weight, the appearance does not change. It has now been surprisingly found that these alkyd resin dispersions constitute a suitable medium for the polymerization of acrylate monomers, the alkyd resin dispersions functioning in the same manner as an organic solvent mixture.

Alkyd resin dispersions suitable as polymerization media are characterized primarily by the specific adjuvants used. As to the resins themselves, short-oil and medium-oil alkyd resins with acid numbers of from about 5 to 40, preferably from about 20 to 30, can be used. For example, alkyd resins with acid numbers of from about 5 to 30 and with OH numbers larger than 200, are known. These resins are generally formulated with the specific emulsifiers which lose their hydrophilic properties during stoving. However, suitable alkyd resins with acid numbers around 40 are also known which generally have a very much lower OH number, that is, from about 150 to 300. Because of their higher acid numbers, such resins can usually be formulated without the aid of emulsifiers. Naturally, mixtures and transitions between these two resin types are also known and suitable. Further suitable are oil-free polyesters that can be formulated to water lacquers, such as, in particular, those resins for the preparation of which non-terminal or terminal olefin oxides with more than 8 carbon atoms have been used and acid group-containing alkyd resins which have been modified with other resins, for example, epoxy resins, phenolic resins, silicone resins, or reaction products of isocyanates. The only prerequisite for the above-mentioned resins is that they can be formulated with the mentioned adjuvants to form aqueous resin preparations which have a solids content greater than 60 percent by weight, preferably greater than 40 percent by weight, and which are so homogeneous that they appear essentially clear to the eye.

According to the invention, the preparation of the alkyd/acrylates is affected by adding monomers to the aqueous alkyd resin preparations, either singly or in mixture, batchwise or continuously, under such conditions that radical polymerization can take place. Suitable monomers include amine salts of polymerizable acids, such as acrylic acid, methacrylic acid, and itaconic acid; esters of said polymerizable acids with aliphatic alcohols, such as lower alkyl acrylates and methacrylates, for example, butyl acrylate and butyl methacrylate; and lower alkylol esters of said polymerizable acids, such as lower alkylol acrylates and methacrylates, for example, 2-hydroxyethyl methacrylate. Methyl methacrylate, ethyl acrylate, 2-hydroxyethyl methacrylate, and butyl acrylate are particularly useful. Small amounts of the polymerizable acids, such as acrylic acid or methacrylic acid, may be present in the comonomer mixtures. Further suitable monomers include acrylonitrile and acrylamide. The use of monomers containing carboxyl groups or hydroxyl groups is particularly advantageous if cross-linking or hardening agents, such as hexamethylol melamine or similar preliminary condensates of melamine-formaldehyde, are used in the production of the lacquer system.

According to another aspect of the invention, a portion of the monomeric acrylic acid or methacrylic acid derivatives can be replaced by radically polymerizable unsaturated hydrocarbons, such as styrene, α-methylstyrene, or butadiene. Preferably up to 60 percent by weight, more preferably, from about 5 to 40 percent by weight, of the monomer mixture charged may consist of styrene.

It is known that the hardness and flexibility of acrylate lacquers primarily depends upon the monomers used. Thus, an increased proportion of methyl methacrylate and/or styrene brings about rather hard coatings, while a larger proportion of butyl acrylate or ethyl acrylate gives soft flexible coatings. Further, to obtain a lower molecular weight and hence a lower viscosity of the lacquer, the addition of so-called regulators is known. Compounds with free mercapto groups, such as thioglycolic acid, are commonly used as regulators.

If hexamethylol melamine ethers or similar melamine formaldehyde condensates are used for hardening the lacquers, it is advisable to use an amount of monomers with hydroxyl groups or of amine salts of polymerizable acids sufficient for the condensation. Those skilled in the art can determine the proper amount by a few preliminary tests. Thus, for example, an acrylate which is composed so that it has a hydroxyl number of 80 and an acid number of 20, can be regarded as suitable.

The alkyd resins thus produced can be neutralized with condensable amines which have a high boiling point. Preferably adducts of glycidol are used for this purpose. Such amines containing suitable hydroxyl groups for neutralization include, for example, the adducts of glycidol onto butylamine, ethanolamine, as well as 2-amino-2-methyl-propanol, as are disclosed in U.S. Pat. No. 4,259,219, incorporated herein by reference. The amines are not volatile under stoving conditions and are incorporated into the lacquer through existing hydroxyl groups.

To initiate the polymerization in the aqueous alkyd resin preparations, common initiators can be used. However, to avoid having inorganic salts, which are not desired in lacquers, remain in the preparations, organic initiators from the group consisting of azo compounds and organic peroxides are preferred. One skilled in the art would be familiar with a plurality of such compounds with a broad area of application with respect to the polymerization temperature. Examples of such compounds include azoisobutyric nitrile, benzoyl peroxide, and lauryl peroxide, as well as the other radical-supplying peroxide systems such as ammonium peroxodisulfate or potassium peroxodisulfate, optionally together with a reducing agent such as sodium sulfite or sodium dithionite.

The mentioned monomers are partly quite soluble in water but also partly soluble only in organic solvents. It was therefore surprising and in no way predictable that the mentioned aqueous alkyd resin dispersions could be mixed with the required monomer quantities without a phase separation occurring. Instead, the systems also remain homogeneous during the polymerization, that is, the systems comprise clear solutions/microemulsions or also finely divided sedimentation-stable dispersions without coagulate content.

Nothing is known about the structure of the acrylate resins formed by polymerization in aqueous alkyd dispersions, particularly with regard to the extent chemical bonds to alkyd resin molecules form. It is presumed, however, that statistically macromolecules of the acrylate resin are formed and that these macromolecules are present in intimate mixture with the alkyd resin molecules. In any event, desegregation processes were not observed during either heating or cooling of the preparations.

According to a preferred embodiment of the invention, microemulsions known from U.S. Pat. No. 4,271,051 are used as polymerization medium. This is a system which contains alkyd resin of relatively low molecular weight with an acid number of from about 5 to 30 and a hydroxyl number greater than 200 in the presence of a non-volatile neutralization agent and an emulsifier which does not lose its effectiveness during stoving.

Such alkyd resins are produced by reacting known raw materials, for example, mixtures of natural fatty acids or dicarboxylic or tricarboxylic acids, such as phthalic acid, trimellitic acid, adipic acid, sebacic acid, terephthalic acid, or the like, with polyhydric alcohols, such as glycerol, neopentyl glycol, diethylene glycol, or trimethylolpropane, under esterification conditions. The procedure is to first condense to an acid number of from 30 to 180 and then, in a second stage, to esterify to a residual acid number below 30 by addition of glycidol. In this manner the resins obtain their high hydroxyl functionality.

Examples of suitable non-volatile amines for neutralization are disclosed in U.S. Pat. No. 4,259,219. The glyceryl amines described there are characterized by high OH functionality. On stoving they become a lacquer component, as is also the case with the emulsifiers used. Advantageously nonionic emulsifiers are used. Emulsifiers which are formed by the addition of glycidol to nonylphenol or longer-chained monoamines or fatty alcohols are preferred.

Instead of these emulsifiers, other emulsifiers with reactive groups in the molecule may be added which upon stoving lose their hydrophilic properties, for example, long-chain amino oxides. Since the reactive groups are chemically incorporated into the resulting film, their presence does not result in water-susceptibility of the finished lacquer film.

According to a further preferred embodiment of the invention, water lacquers based on resins with an acid number of about 40 and a hydroxyl number of about 150 are used. Because of their high acid numbers, such resins generally do not require emulsifiers.

For the production of the alkyd acrylates, first the aqueous alkyd resin dispersions are adjusted with water to a solids content of from about 30 to 90 percent by weight, preferably from about 60 to 85 percent by weight, dependent upon viscosity. For a specific application, preliminary testing can be used to determine how much water must be added to obtain a suitable starting viscosity still conductive to polymerization. An expedient way to do this is to go by the viscosity at the polymerization temperature. Dependent upon the initiator used, the polymerization temperature is from about 40° C. to the boiling point of the polymerization mixture. If especially high molecular weights are desired and if suitable initiators are used, polymerization is possible at room temperature or below.

The monomers are added singly or in mixture, entirely or portion by portion. With reference to the copolymerization parameters, one skilled in the art can calculate which monomers must be added more quickly or more slowly to obtain a homogeneous statistical composition of the resin molecules, if this is desired. From 9 parts by weight of alkyd resin, per part by weight of acrylate resin, up to 4 parts by weight of acrylate resin, per part by weight of alkyd resin, can be produced in this way. It is, of course, possible also to produce only very small acrylate resin quantities in the alkyd resin, if this is desired. A weight ratio of alkyd resin to acrylate resin of from about 1:2 to 5:1 has proven particularly successful. To prevent an increase in viscosity during the polymerization, the product may be rediluted with water. Advantageously enough water is added during the polymerization for the total system to reach a solids content of from about 40 to 75 percent by weight.

With the resin combinations producible according to the invention, virtually neutral water lacquers with a pH-value of from about 6 to 8 can be formulated. In this pH range the resins exhibit particularly good resistance to hydrolysis and, thus, good storage stability. The process products are suitable as such as binders for stove-drying, water-dilutable lacquer systems, but they can also be blended with other water lacquers in any desired ratio.

For the stoving of the lacquers hardening components must be added. Melamine resins, which are available in great numbers, are suitable as hardening components. Especially suitable are solvent-free, or at least low-solvent, melamine resin preparations, particularly the water-compatible ones.

The stoving of the lacquers is effected at temperatures of from about 120° to 175° C., but preferably from about 135° to 165° C., for a period of 10 to 40 minutes. Due to the special formulation described herein, practically no volatile component passes into the atmosphere. In some cases it is advisable to subject the lacquer systems produced according to the invention to a preliminary drying phase after application. After most of the water has evaporated, the stoving can be effected in drying ovens or drying tunnels.

The lacquer systems according to the invention can be used for coating various materials, such as metal, glass, or even wood. Preferably the lacquer systems of the invention are applied as coating on steel, iron, aluminum, or one of the other materials frequently used in industry.

The lacquer system according to the invention can also be pigmented in known manner.

The following examples are intended to illustrate the invention and should not be construed as limiting the invention thereto.

EXAMPLES

I. Preparation of Aqueous Alkyd Resin Dispersion

Example 1

Condensation was effected in known manner in a heatable glass apparatus equipped with agitator, water separator, and nitrogen supply, with the addition of xylene (80 ml) until the indicated acid number was reached. The reaction mixture consisted of the following:

| | |
|---|---|
| Mixture of fatty acids (1% myristic acid, 11% palmitic acid, 5% stearic acid, 23% oleic acid, 58% linoleic acid, 1% linolenic acid, and 1% arachic acid) | 257.4 gm |
| Glycerol | 84.6 gm |
| Neopenthyl glycol | 254.7 gm |
| Phthalic acid anhydride | 226.8 gm |
| Trimellitic acid anhydride | 176.4 gm |

The reaction mixture was polycondensed to an acid number of 95.5 at a maximum temperature of 190° C. over a period of one and one-half hours. Thereafter, 994.4 gm of the condensate were reacted with 73.2 gm of glycerol to reach an acid number of 57.8. Then xylene was removed.

Subsequently, glycidol was added onto this condensate with the acid number of 57.8 in a third reaction stage. An amount of 993.0 gm of the alkyd resin having an acid number of 57.8 was reacted with 30.0 gm of an amine (adduct of 1 mol of glycidol onto 1 mol of diethanolamine) and 48.3 gm of glycidol for ten minutes at 120° C. The resulting alkyd resin, which had an acid number of 22.5, was then mixed hot with 5.3 gm of an adduct of 7.5 mols of glycidol onto 1 mol of nonylphenol as an auxiliary emulsifier and 7.4 gm of the adduct of 1 mol of glycidol onto 1 mol of diethanolamine, based upon 100 gm of alkyd resin. Subsequently the resulting alkyd resin was diluted with water to the desired active substance content.

II. Polymerization in the Alkyd Resin Dispersion

Example 2

One hundred grams of a resin solution prepared according to Example 1 having a solids content of 85 percent by weight, were charged into a standard polymerization apparatus (agitator, reflux condensor, nitrogen inlet and outlet, and drip funnel), and over a period of 90 minutes at temperatures of from about 85° to 100° C., the following mixture of monomers, regulator, and initiator was added dropwise:

| Methyl methacrylate | 24.8 gm |
| --- | --- |
| Butyl acrylate | 18.6 gm |
| 2-Hydroxyethyl methacrylate | 10.5 gm |
| Methacrylic acid | 5.6 gm |
| Thioglycolic acid | 2.5 gm |
| Azoisobutyronitrile (AIBN) | 0.6 gm |

After a post-reaction time of thirty minutes, 23 gm of the adduct of 2 mols of glycidol onto 1 mol of 2-amino-2-methylpropanol in 23 gm of water were added, and then, for improved stirrability, an additional 35 gm of water were added. The resulting resin solution was clear to slightly opaque, was infinitely water-dilutable, and had a solids content (including amines) of 70 percent by weight. The alkyd/acrylate weight ratio was 1:1.

Example 3

Example 2 was carried out once more with the same alkyd resin quantity, that is, a solids content of 85 percent by weight, and under the same conditions, but the monomer quantities were as follows:

| Methyl methacrylate | 6.5 gm |
| --- | --- |
| Butyl acrylate | 5.6 gm |
| 2-Hydroxyethyl methacrylate | 3.2 gm |
| Methacrylic acid | 2.7 gm |
| Thioglycolic acid | 0.8 gm |
| AIBN | 0.2 gm |

After a post-reaction time of thirty minutes, 9.5 gm of the adduct of 2 mols of glycidol onto 1 mol of 2-amino-2-methylpropanol in 9.5 gm of water was added, and then an additional 4.5 gm of water were added for adjustment to 80 percent by weight solids. The resulting resin solution was clear and infinitely water-dilutable. The alkyd/acrylate weight ratio was 3:1, and the acid number of the acrylate component was 120.

Example 4

According to a procedure analogous to that of Example 2, a resin was prepared from the following:

| Methyl methacrylate | 8.6 gm |
| --- | --- |
| Butyl acrylate | 6.4 gm |
| 2-Hydroxyethyl methacrylate | 3.6 gm |
| Methacrylic acid | 2.6 gm |
| AIBN | 0.2 gm |

Amounts of 7.2 gm of the adduct of 2 mols of glycidol onto 2-amino-2-methylpropanol and 13.4 gm of water were added, the resulting solids content being 80 percent by weight. The resin solution was clear and infinitely water-dilutable, and the alkyd/acrylate weight ratio was 3:1. The acid number of the acrylate component was 80.

Example 5

According to a procedure analogous to that of Example 2, a resin was prepared from the following:

| Methyl methacrylate | 5.2 gm |
| --- | --- |
| Butyl acrylate | 3.8 gm |
| 2-Hydroxyethyl methacrylate | 2.2 gm |
| Methacrylic acid | 1.6 gm |
| AIBN | 0.1 gm |

Amounts of 4.3 gm of the adduct of 2 mols of glycidol onto 2-amino-2-methylpropanol and 10.4 gm of water were added, the resulting solids content being 80 percent by weight. The resin solution was clear and infinitely water-dilutable, and the alkyd/acrylate weight ratio was 5:1.

Example 6

According to a procedure analogous to that of Example 2, one hundred grams of a resin solution prepared according to Example 1, having a solids content of 50 percent by weight, were charged onto a standard polymerization apparatus as "solvent" for polymerization. The polymerization mixture was comprised as follows:

| Ethyl acrylate | 13.9 gm |
| --- | --- |
| Methyl methacrylate | 22.0 gm |
| 2-Hydroxyethyl methacrylate | 8.2 gm |
| Methacrylic acid | 6.1 gm |
| AIBN | 0.5 gm |

Prior to addition of the polymerization mixture, 16.83 gm of the adduct of 2 mols of glycidol onto 1 mol of 2-amino-2-methylpropanol dissolved in 16.83 gm of water, were added. Fifty grams of water were added during the polymerization for better stirrability.

The product obtained was a stable, white dispersion with a solids content of 50 percent by weight and an alkyd/acrylate ratio of 3:4 (in the neutralized form including amine). The dispersion was infinitely dilutable in water.

Example 7 (Comparison)

(a) An acrylate resin in emulsion was produced by known methods as follows:

In a standard polymerization apparatus, 443 gm of water and 4 gm of lauryl alcohol-2-ethylene oxide-sulfate-Na-salt as well as 12 gm of thioglycolic acid were charged, and after flushing with nitrogen, the following monomers and initator were added dropwise at 90° C. over a period of one hour:

| | |
|---|---|
| Methyl methacrylate | 116 gm |
| Butyl acrylate | 87 gm |
| 2-Hydroxyethyl methacrylate | 50 gm |
| Methacrylic acid | 26 gm |
| AIBN | 3 gm |

The dispersion was subjected to a post-reaction for thirty minutes and then neutralized with 103 gm of the adduct of 2 mols of glycidol onto 2-amino-2-methyl-propanol in 166 gm of water. A cloudy resin solution with 40 percent by weight solids content resulted.

(b) By mixture of the alkyd resin from Example 1 with the acrylate resin from step (a), an alkyd acrylate with an alkyd/acrylate weight ratio of 1:1 and a solids content of 50 percent by weight was produced. The resin solution was opaque.

Example 8 (Comparison)

According to procedures analogous to those of Example 7, an opaque resin solution with an alkyd/acrylate weight ratio of 3:1 and a solids content of 50 percent by weight was prepared.

In Examples 2 to 6 above, the monomers polymerized have comprised various alkyl and alkylol acrylates or methacrylates as well as methacrylic acid. It should be noted that up to about 60 percent by weight, preferably from about 5 to 40 percent by weight, of said monomers could be replaced by polymerizable unsaturated hydrocarbons such as styrene or α-methylstyrene.

III. Preparation of Lacquer Films

For the production of lacquers, the products prepared according to Examples 2 to 8 were mixed with hexamethyl ether of hexamethylol melamine (HMMM) as a cross-linking agent in amounts of 7 parts by weight of alkyd/acrylate product to 3 parts by weight of HMMM. Then the resulting solutions were adjusted to solids contents of 45 percent by weight.

To test the lacquer film properties, the respective coating materials were spread on degreased steel plates and stoved at 150° C. for 20 minutes. The dry film thickness was 50μ. All the lacquer films were clear, hard, and glossy. While the binders from Examples 2 to 6 resulted in coatings which did not present any disorders or irregularities in spreading, the plates coated with the comparison products from Examples 7 and 8 showed strong cratering.

Pendulum impact hardnesses according to DIN 53 157 were determined for the coatings. For Examples 2 to 6, the impact hardnesses were from 125 to 150 seconds; for Examples 7 and 8, the impact hardnesses were 144 and 106 seconds, respectively, with a strong dependence up on the measurement point. The deep-drawing test according to Erichsen gave values between 7.5 and 10.0 mm, depending on the pendulum hardness.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for the preparation of water-dilutable resin preparations based upon alkyd and acrylate resins which comprises the steps of:
   (a) preparing an aqueous alkyd resin dispersion wherein the alkyd resin has an acid number of from about 5 to 40 and a hydroxyl number of from about 150 to 300 and the dispersion has a solids content of from about 30 to 90 percent by weight by reacting an alkyd resin having an acid number of from about 30 to 100 with glycidol, glycerol, or a mixture thereof until the acid number is from about 5 to 40; and
   (b) polymerizing monomers of acrylic acid derivatives and/or methacrylic acid derivatives in the dispersion from step (a) to obtain a total solids content of from about 30 to 80 percent by weight, the weight ratio of alkyd resin to acrylate resin being from about 1:4 to 9:1.

2. The method of claim 1, wherein the aqueous alkyd resin dispersion is free from auxiliary solvents and volatile amines and either does not contain any emulsifiers or only contains emulsifiers which lose their original hydrophilic properties under stoving conditions.

3. The method of claim 1, wherein the aqueous alkyd resin dispersion of step (a) has a solids content of from about 60 to 85 percent by weight.

4. The method of claim 1, wherein the aqueous alkyd resin has an acid number of from about 20 to 30.

5. The method of claim 1, wherein the total solids content in step (b) is from about 40 to 75 percent by weight and the weight ratio of alkyd resin to acrylate resin is from about 1:2 to 5:1.

6. The method of claim 1, wherein the reaction of step (a) occurs in two or more stages.

7. The method of claim 1, wherein the alkyd resin having an acid number of from 5 to 40 is neutralized by reaction with a condensable amine.

8. The method of claim 7, wherein the condensable amine is an adduct of glycidol onto butylamine, ethanolamine, or 2-amino-2-methyl-propanol.

9. The method of claim 1, wherein the monomers of acrylic acid or methacrylic acid derivatives of step (b) are a combination of those which as homopolymers have a glass temperature above room temperature with those which as homopolymers have a glass temperature below room temperature.

10. The method of claim 9, wherein the monomer which has a glass temperature above room temperature is methyl methacrylate.

11. The method of claim 1, wherein the monomers of acrylic acid or methacrylic acid derivatives are selected from the group consisting of lower alkyl acrylates and methacrylates and lower alkylol acrylates and methacrylates.

12. The method of claim 11, wherein the monomers also comprise a small amount of a polymerizable acid.

13. The method of claim 12, wherein the polymerizable acid is acrylic acid, methacrylic acid, or itaconic acid.

14. The method of claim 1, wherein the monomers polymerized in step (b) also comprise radically polymerizable hydrocarbons.

15. The method of claim 14, wherein the monomers comprise up to about 60 percent by weight, based upon the weight of the monomers, of styrene.

16. The method of claim 15, wherein the monomers comprise from about 5 to 40 percent by weight, based upon the total weight of the monomers, of styrene.

17. The method of claim 1, wherein in step (b) the polymerization takes place in the presence of additional water.

18. A lacquer binder which comprises a water-dilutable resin preparation prepared according to claim 1.

19. In a method for preparing a water-dilutable lacquer system by admixing lacquer binder with other conventional lacquer system components,
the improvement wherein the lacquer binder comprises from 20 to 60 percent by weight, based upon the weight of the total lacquer system, of the lacquer binder of claim 18.

20. A lacquer system prepared according to claim 19.

21. A method for the preparation of water-dilutable resin preparations based upon alkyd and acrylate resins which comprises the steps of:
(a) preparing an aqueous alkyd resin dispersion wherein the alkyd resin has an acid number of from about 5 to 40 and a hydroxyl number of from about 150 to 300 and the dispersion has a solids content of form about 30 to 90 percent by weight by reacting an alkyd resin having an acid number of from about 30 to 100 with glycidol, glycerol, or a mixture thereof until the acid number is from about 5 to 40; and
(b) polymerizing monomers of acrylic acid derivatives and/or methacrylic acid derivatives comprising a combination of those which as homopolymers have a glass temperature above room temperature with those which as homopolymers have a glass temperature below room temperature, in the dispersion from step (a) to obtain a total solids content of from about 30 to 80 percent by weight, the weight ratio of alkyd resin to acrylate resin being from about 1:4 to 9:1.

22. A method for the preparation of water-dilutable resin preparations based upon alkyd and acrylate resins which comprises the steps of:
(a) preparing an aqueous alkyd resin dispersion wherein the alkyd resin has an acid number of from about 5 to 40 and a hydroxyl number of from about 150 to 300 and the dispersion has a solids content of from about 30 to 90 percent by weight by (i) reacting an alkyd resin having an acid number of from about 30 to 100 with glycidol, glycerol, or a mixture thereof until the acid number is from about 5 to 40 and (ii) reacting the product thereof with a condensable amine; and
(b) polymerizing monomers of acrylic acid derivatives and/or methacrylic acid derivatives comprising a combination of those which as homopolymers have a glass temperature above room temperature with those which as homopolymers have a glass temperature below room temperature, in the dispersion from step (a) to obtain a solids content of from about 30 to 80 percent by weight, the weight ratio of alkyd resin to acrylate resin being from about 1:4 to 9:1.

23. The method of claim 22, wherein the condensable amine is an adduct of glycidol onto butylamine, ethanolamine, or 2-amino-2-methyl-propanol.

* * * * *